United States Patent
Shinohara et al.

(10) Patent No.: US 12,041,462 B2
(45) Date of Patent: Jul. 16, 2024

(54) WIRELESS COMMUNICATION CHARACTERISTIC EVALUATION METHOD

(71) Applicant: NIPPON TELEGRAPH AND TELEPHONE CORPORATION, Tokyo (JP)

(72) Inventors: Shoko Shinohara, Musashino (JP); Toshiro Nakahira, Musashino (JP); Yasuhiko Inoue, Musashino (JP); Hirantha Abeysekera, Musashino (JP); Koichi Ishihara, Musashino (JP); Takafumi Hayashi, Musashino (JP); Yasushi Takatori, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 387 days.

(21) Appl. No.: 17/600,554

(22) PCT Filed: Mar. 24, 2020

(86) PCT No.: PCT/JP2020/013137
§ 371 (c)(1),
(2) Date: Sep. 30, 2021

(87) PCT Pub. No.: WO2020/203500
PCT Pub. Date: Oct. 8, 2020

(65) Prior Publication Data
US 2022/0174505 A1 Jun. 2, 2022

(30) Foreign Application Priority Data
Apr. 2, 2019 (JP) .................. 2019-070927

(51) Int. Cl.
*H04W 16/22* (2009.01)
*H04L 43/0888* (2022.01)
*H04W 24/08* (2009.01)

(52) U.S. Cl.
CPC ......... *H04W 16/22* (2013.01); *H04L 43/0888* (2013.01); *H04W 24/08* (2013.01)

(58) Field of Classification Search
None
See application file for complete search history.

(56) References Cited

U.S. PATENT DOCUMENTS

| 8,665,906 B1* | 3/2014 | Liu ................ H04W 28/18 370/473 |
| 2004/0102193 A1* | 5/2004 | Kitami ................ H04W 88/06 455/435.3 |

(Continued)

OTHER PUBLICATIONS

The 802.11 Working Group of the LAN/MAN Standards Committee of the IEEE Computer Society, Part 11: Wireless LAN Medium Access Control (MAC) and Physical Layer (PHY) Specifications, IEEE Std 802.Nov. 2016, IEEE Standard for Information technology—Telecommunications and information exchange between systems Local and metropolitan area networks—Specific requirements, Dec. 2016.

(Continued)

*Primary Examiner* — Diane L Lo
(74) *Attorney, Agent, or Firm* — Harness, Dickey & Pierce, P.L.C.

(57) ABSTRACT

There are provided a step 1 of, at a measurement point where a throughput of a wireless communication terminal under a new communication standard is to be acquired, measuring or calculating a wireless communication characteristic (throughput) of a wireless communication terminal under a current communication standard; a step 2 of acquiring parameters of a physical layer and a MAC layer at the time (Continued)

of measuring or calculating the wireless communication characteristic of the wireless communication terminal under the current communication standard; and a step 3 of, with the wireless communication characteristic (throughput) measured or calculated for the wireless communication terminal under the current communication standard and the parameters of the physical layer and the MAC layer at that time as inputs, calculating a wireless communication characteristic (throughput) corresponding to parameters of the wireless communication terminal under the new communication standard.

2 Claims, 3 Drawing Sheets

(56) References Cited

U.S. PATENT DOCUMENTS

2005/0259686 A1* 11/2005 Lewis ................. H04L 69/32
370/469
2008/0101482 A1* 5/2008 Labbe ................ H04L 25/022
375/260

OTHER PUBLICATIONS

Ron Porat et al., 11ax Evaluation Methodology, IEEE P802.11 Wireless LANs, Jan. 21, 2016.

* cited by examiner

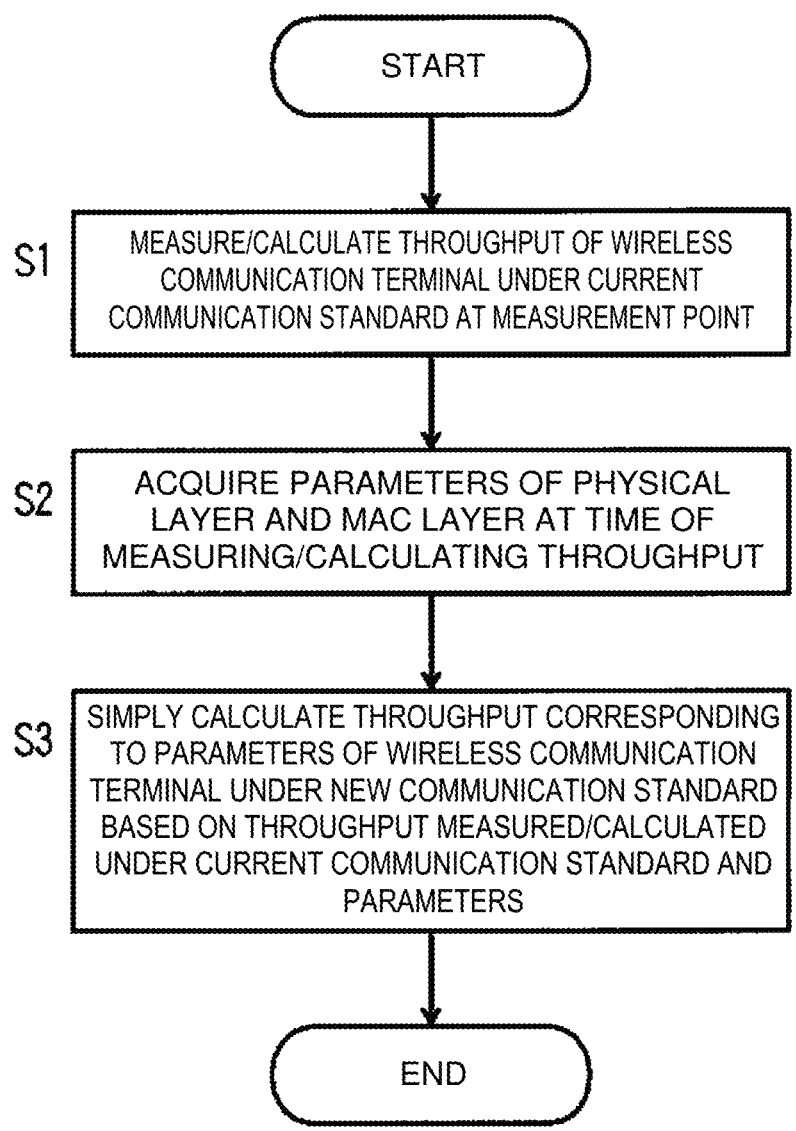

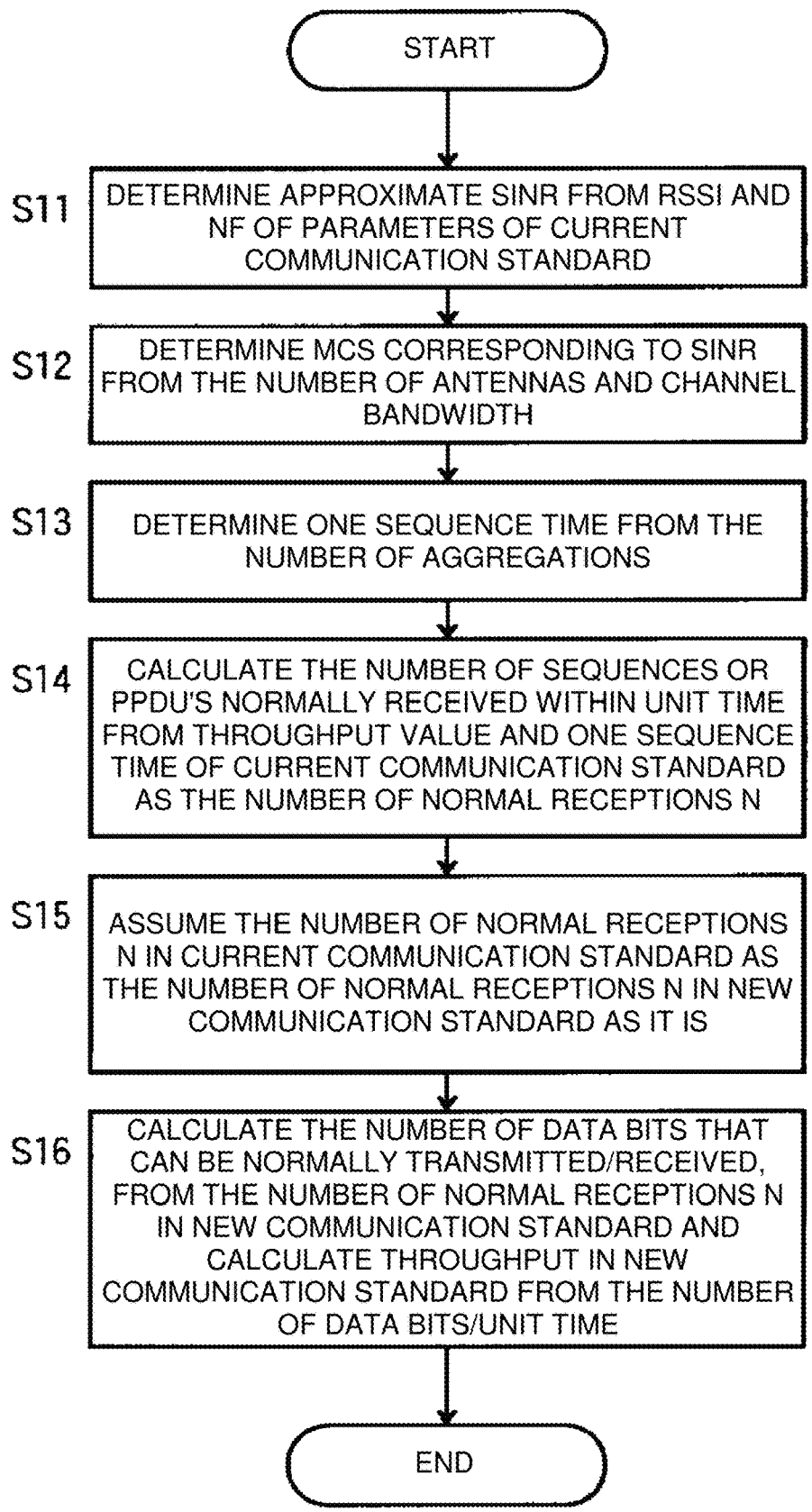

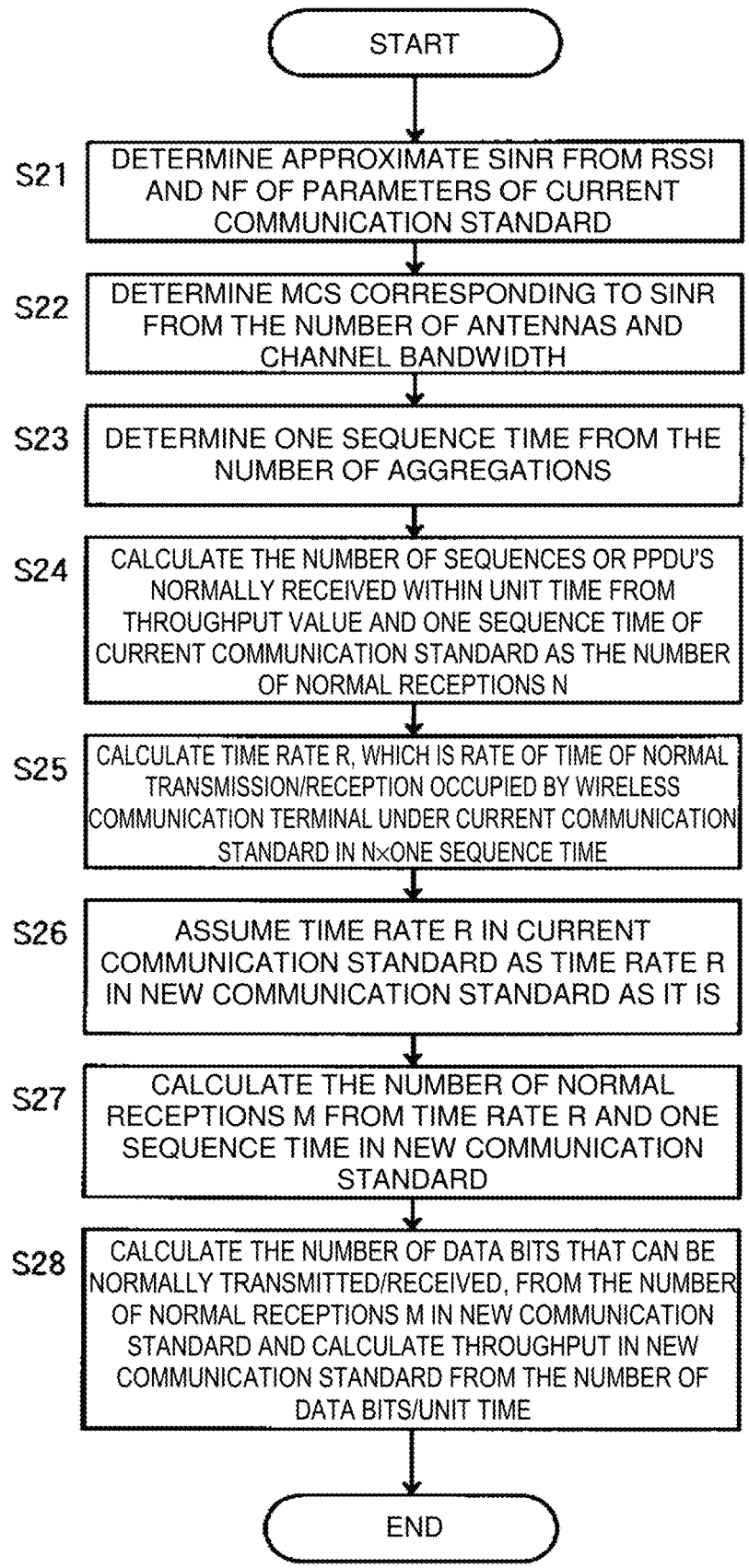

WIRELESS COMMUNICATION CHARACTERISTIC EVALUATION METHOD

CROSS-REFERENCE TO RELATED APPLICATIONS

This application is a 371 U.S. National Phase of International Application No. PCT/JP2020/013137 filed on Mar. 24, 2020, which claims priority to Japanese Application No. 2019-070927 filed on Mar. 1, 2019. The entire disclosures of the above applications are incorporated herein by reference.

TECHNICAL FIELD

The present invention relates to a wireless communication characteristic evaluation method for, in a wireless communication system in which a plurality of wireless communication terminals perform wireless communication, calculating a wireless communication characteristic (a throughput value) of a wireless communication terminal under a new communication standard from a wireless communication characteristic (a throughput value) measured or calculated in a wireless communication terminal under a current communication standard.

BACKGROUND ART

With the spread of smartphones and IoT terminals, wireless communication has been widely used, and demand for a wireless LAN that, can be used in an unlicensed band is increasing. Further, capacity of content using wireless communication, such as video and VR, has been increased, and higher speed of wireless communication is required. Bach time the standard of wireless LAN is newly standardised, higher speed of the physical layer and the MAC layer is realized, and, actually, system throughput has been improved.

In order to evaluate a throughput value of a wireless LAN, it is common to imitate parameters and operations of the physical layer and the MAC layer which differ for each standard, and use computer simulation according to the standard for each measurement position that is uniquely set. However, computer simulation is often expensive, or operation of computer simulation is often not guaranteed completely, and it is difficult to perform throughput evaluation at a low cost.

CITATION LIST

Non-Patent Literature

Non-Patent Literature 1: "IEEE P802.11-2016," December 2016
Non-Patent Literature 2: "11ax Evaluation Methodology," doc.: IEEE802.11-14/0571r12 Jan. 2016

SUMMARY OF THE INVENTION

Technical Problem

In order to use a wireless LAN comfortably, area design may be performed in consideration of the size of an area to be used and a surrounding interference situation. Though higher speed of wireless LAN is expected in the future, it costs much to prepare expensive wireless LAN equipment under a new communication standard for area design of a wireless LAN, assuming use of the wireless LAN equipment, under the new communication standard.

Meanwhile, even if it is attempted to calculate a throughput based on a wireless LAN communication standard for simple wireless LAN area design, channel interference from surroundings, which are an external environment, an error rate due to packet collision, and the like influence, and it is difficult to simply calculate an actual throughput. Note that to simply calculate refers to, for example, calculation which is completed by arithmetic calculation like general spreadsheet software and does not require a high-end program like a computer simulator.

An object of the present invention is to provide a wireless communication characteristic evaluation method capable of, when measurement or calculation of a wireless communication characteristic (a throughput) of a wireless communication terminal under a current communication standard is possible, simply calculating a wireless communication characteristic (a throughput) of a wireless communication terminal under a new communication standard using data of the measurement or calculation.

Means for Solving the Problem

The present invention is a wireless communication characteristic evaluation method for evaluating a wireless communication characteristic of a wireless communication system in which a plurality of wireless communication terminals perform communication by transmitting or exchanging signals, the wireless communication characteristic evaluation method including: a step 1 of, at a measurement point where a throughput of a wireless communication terminal under a new communication standard is to be acquired, measuring or calculating a wireless communication characteristic (throughput) of a wireless communication terminal under a current communication standard; a step 2 of acquiring parameters of a physical layer and a MAC layer at the time of measuring or calculating the wireless communication characteristic of the wireless communication terminal under the current communication standard; and a step 3 of, with the wireless communication characteristic (throughput) measured or calculated for the wireless communication terminal under the current communication standard and the parameters of the physical layer and the MAC layer at that time as inputs, calculating a wireless communication characteristic (throughput) corresponding to parameters of the wireless communication terminal under the new communication standard.

In the wireless communication characteristic evaluation method of the present invention, the step 3 includes: a step 11 of calculating the number of normal receptions N, which is the number of times of performing normal reception within a unit time, from the wireless communication characteristic (throughput) and one sequence time measured or calculated in the wireless communication terminal under the current communication standard, and assuming the number of normal, receptions N as the number of normal receptions N in the wireless communication terminal under the new communication standard; and a step 12 of calculating the number of data bits that can be normally received within the unit time from the number of normal receptions N in the wireless communication terminal under the new communication standard and the parameters, and calculating the wireless communication characteristic (throughput) under the new communication standard from the number of data bits/the unit time.

In the wireless communication characteristic evaluation method of the present invention, the step 3 includes: a step 21 of calculating the number of normal receptions N, which is the number of times of performing normal reception within a unit time, from the wireless communication characteristic (throughput) and one sequence time measured or calculated in the wireless communication terminal under the current communication standard, and calculating a time rate R, which is a rate of time of normal transmission/reception occupied by the wireless communication terminal under the current communication standard within the unit time in the number of normal reception times N×the one sequence time; a step 22 of assuming the rime rate R as a time rate R, which is a rate of time occupied by the wireless communication terminal under the new communication standard at the time of normal reception; a step 23 of calculating the number of normal receptions M from the time rate R and one sequence time of the wireless communication terminal under the new communication standard; and a step 24 of calculating the number of data bits that the wireless communication terminal under the new communication standard can normally receive from the number of normal receptions M and calculating the wireless communication characteristic (throughput) under the new communication standard from the number of data bits/the unit time.

Effects of the Invention

In the present invention, it is possible to, based on data measured by installing a wireless communication terminal under a current communication standard, and the like, simply evaluate a wireless communication characteristic (throughput) without performing re-measurement when a wireless communication terminal under a new communication standard different from the current communication standard is installed. Especially, even in such an environment that throughput depends on external factors such as interference and packet collision, it is possible to evaluate the environment only by desk calculation based on data acquired beforehand. Therefore, it is possible to perform area design without spending the cost of purchasing the equipment.

BRIEF DESCRIPTION OF DRAWINGS

FIG. 1 is a flowchart showing an outline of a wireless communication characteristic calculation procedure in the present invention.

FIG. 2 is a flowchart showing a simple calculation procedure example 1 for a throughput of a wireless communication terminal under a new communication standard.

FIG. 3 is a flowchart showing a simple calculation procedure example 2 for the throughput of the wireless communication terminal under a new communication standard.

DESCRIPTION OF EMBODIMENT

FIG. 1 shows an outline of a wireless communication characteristic calculation procedure in the present invention.

Here, a calculation procedure for simply calculating a throughput of a wireless communication terminal under a new communication standard different from a current communication standard using data of a wireless communication terminal under the current communication standard for which a throughput can be measured or calculated as a wireless communication characteristic.

In FIG. 1, at a measurement point at which a throughput of a wireless communication terminal under a new communication standard is to be acquired, a throughput of a wireless communication terminal under a current communication standard is measured or calculated (S1). Next, parameters of a physical layer and a MAC layer at the time of measuring or calculating the throughput is acquired (S2). Furthermore, with the throughput measured or calculated for the wireless communication terminal under the current communication standard and the parameters of the physical layer and the MAC layer at that time as inputs, a throughput corresponding to parameters of the wireless communication terminal under the new communication standard is simply calculated (S3). Here, the simple calculation is such that general spreadsheet software or desk calculation are possible therefore, and it will be described below in detail. From a result of the calculation, the throughput of the wireless communication terminal under the new communication standard that is actually not installed can be acquired and evaluated.

Simple Calculation Procedure Example 1

FIG. 2 shows a simple calculation procedure example 1 for the throughput of the wireless communication terminal under the new communication standard.

In this simple calculation, the throughput measured or calculated for the wireless communication terminal under the current communication standard and the parameters of the physical layer and the MAC layer at the time of the measurement or calculation are input values as shown in steps S1 and S2 of FIG. 1. Note that the parameters of the physical layer and the MAC layer are data of the wireless communication terminal such as the number oi antennas, a channel bandwidth, an RSSI (Received Signal Strength Indication), the number of aggregations of an A-MPDU (Aggregate MAC Protocol Data Unit) and possibility/impossibility of multi-user transmission.

In FIG. 2, first, from the RSSI and an NF (Noise Figure) among the parameters, an approximate SINR (Signal to Interference plus Noise power Ratio) at the time of measuring the throughput at the measurement point is calculated and determined (S11). Since a receive power value and a noise floor value are known from the RSSI and the NF, respectively, the SINR assumed at the measurement point can be calculated. Even when interference power is unknown, influence of a packet error or packet loss due to interference power can be considered at steps S14 and S15, and, therefore, the calculation is performed on the assumption that there is no interference power.

Next, an MCS corresponding to the SINR is determined from the number of spatial streams, the channel bandwidth and the like calculated from the number of antennas of the wireless communication terminal used for the measurement of the throughput (S12). Here, the MCS corresponding to the SINR can be uniquely determined, for example, selecting an MCS that is below a certain PER at the SINR, using SINR-to-PER data for each modulation/demodulation scheme, for each of the numbers of spatial streams and the channel bandwidths.

Next, one sequence time is calculated and determined, using the number of aggregations set as an input value or the number of aggregations that can be calculated from a numerical value specified by the standard used at the time of measuring the throughput (S13). Here, one sequence time in a wireless LAN is time required for normal one frame transmission, such as an average time required for channel access, data transmission time and response frame time.

Next, from the throughput value measured or calculated beforehand for the wireless communication terminal under the current communication standard, the number of sequences or the number of PPDUs (the number of wireless frames) normally received within a unit time (example: one second) based on the one sequence time (S14). For example, if the standard used at the time of measuring the throughput is IEEE802.11n, the measured throughput is 50 Mbps, and the number of aggregations is 45 from the MCS or the like determined before, then the number of sequences or the number of PPDUs included in the unit time is 94.35.

Next, the number of sequences or the number of PPDUs is set as the number of times of the wireless communication terminal under the current communication standard getting a transmission chance and succeeding in transmission or the number of normal receptions N, and the number of normal receptions N is assumed to be the number of normal receptions N of the wireless communication terminal under the new communication standard as it is (S15).

Next, on the assumption that the one sequence time is almost the same between the current communication standard and the new communication standard and that the wireless communication terminal under the new communication standard can normally perform transmission/reception N times within the unit time, the number of bits that can be normally transmitted/received (=data size transmitted at one time×N) is calculated from the number of normal receptions N. Then, a throughput is calculated by dividing the number of bits by the unit time (S16). In other words, since it is assumed here that the one sequence time and the number of normal receptions N within the unit time are almost the same between the current communication standard and the new communication standard, a difference in the data size transmitted at one time is calculated as a difference in the throughput. Note that it is assumed that the number of bits that the wireless communication terminal under the new communication standard can transmit/receive is also calculated from the number of spatial streams, a channel bandwidth, an MCS and the number of aggregations assumed from the same SINR, and the like.

Simple Calculation Procedure Example 2

FIG. 3 shows a simple calculation procedure example 2 for the throughput of the wireless communication terminal under the new communication standard.

In FIG. 3, steps S21 to S24 are the same as steps S11 to S14 of the simple calculation procedure example 1 shown in FIG. 2.

Next, a time rate R, which is a rate of time of normal transmission/reception occupied by the wireless communication terminal under the current communication standard used at the time of measuring or evaluating the throughput, at the time of the measurement at the measurement point in the number of normal receptions N of PPDU×the one sequence time is calculated (S25). In this example, the time rate R is 0.41.

Next, this time rate R is assumed to be a time rate R, which is a rate of time occupied by the wireless communication terminal under the new communication standard at the time of normal reception, as it is (S26).

Next, the number of normal receptions M is calculated from the time rate R and one sequence time of the wireless communication terminal under the new communication standard (S27). In other words, in the simple calculation procedure example 1 shown in FIG. 2, the number of normal receptions N of the wireless communication terminal under the current communication standard is assumed to be the number of normal receptions N of the wireless communication terminal under the new communication standard as it is. In comparison, in the simple calculation procedure example 2, the one sequence time of the wireless communication terminal under the new communication standard is considered and reflected on the number of normal receptions M. Note that it is assumed that the one sequence time of the wireless communication terminal under the new communication standard is also calculated from the number: of spatial streams, a channel bandwidth, and an MCS and the number of aggregations assumed from the same SINR.

Next, on the assumption that the wireless communication terminal under the new communication standard can normally perform transmission/reception M times, the number of bits that can be normally transmitted/received from the number of normal receptions M (=data size transmitted at one time×M) is calculated, and a throughput is calculated by dividing the number of bits by the unit time (S28). In other words, though it is assumed here that the time rate R of normal transmission/reception depending on a communication environment is assumed to be almost the same between the current communication standard and the new communication standard, a difference between the numbers of normal receptions N and M due to a difference in the one sequence time and a difference in the data size transmitted at one time are calculated as a difference in the throughput.

The invention claimed is:

1. A wireless communication characteristic evaluation method for evaluating a wireless communication characteristic of a wireless communication system in which a plurality of wireless communication terminals perform communication by transmitting or exchanging signals, the wireless communication characteristic evaluation method comprising:

a step 1 of, at a measurement point where a throughput of a wireless communication terminal under a new communication standard is to be acquired, measuring or calculating a wireless communication characteristic (throughput) of a wireless communication terminal under a current communication standard;

a step 2 of acquiring parameters of a physical layer and a MAC layer at the time of measuring or calculating the wireless communication characteristic of the wireless communication terminal under the current communication standard; and a step 3 of, with the wireless communication characteristic (throughput) measured or calculated for the wireless communication terminal under the current communication standard and the parameters of the physical layer and the MAC layer at that time as inputs, calculating a wireless communication characteristic (throughput) corresponding to parameters of the wireless communication terminal under the new communication standard; wherein the step 3 further comprises:

a step 11 of calculating the number of normal receptions N, which is the number of times of performing normal reception within a unit time, from the wireless communication characteristic (throughput) and one sequence time measured or calculated in the wireless communication terminal under the current communication standard, and assuming the number of normal receptions N as the number of normal receptions N in the wireless communication terminal under the new communication standard; and a step 12 of calculating the number of data bits that can be normally received within the unit time from the number of normal receptions N in the wireless communication terminal under the new communication standard and the parameters, and calculating the wireless communication characteristic (throughput) under the new communication standard from the number of data bits/the unit time.

2. A wireless communication characteristic evaluation method for evaluating a wireless communication characteristic of a wireless communication system in which a plurality of wireless communication terminals perform communication by transmitting or exchanging signals, the wireless communication characteristic evaluation method comprising:

a step 1 of, at a measurement point where a throughput of a wireless communication terminal under a new communication standard is to be acquired, measuring or calculating a wireless communication characteristic (throughput) of a wireless communication terminal under a current communication standard;

a step 2 of acquiring parameters of a physical layer and a MAC layer at the time of measuring or calculating the wireless communication characteristic of the wireless communication terminal under the current communication standard; and a step 3 of, with the wireless communication characteristic (throughput) measured or calculated for the wireless communication terminal under the current communication standard and the parameters of the physical layer and the MAC layer at that time as inputs, calculating a wireless communication characteristic (throughput) corresponding to parameters of the wireless communication terminal under the new communication standard; wherein the step 3 further comprises:

a step 21 of calculating the number of normal receptions N, which is the number of times of performing normal reception within a unit time, from the wireless communication characteristic (throughput) and one sequence time measured or calculated in the wireless communication terminal under the current communication standard, and calculating a time rate R, which is a rate of time of normal transmission/reception occupied by the wireless communication terminal under the current communication standard within the unit time in the number of normal reception times N×the one sequence time;

a step 22 of assuming the time rate R as a time rate R, which is a rate of time occupied by the wireless communication terminal under the new communication standard at the time of normal reception;

a step 23 of calculating the number of normal receptions M from the time rate R and one sequence time of the wireless communication terminal under the new communication standard; and a step 24 of calculating the number of data bits that the wireless communication terminal under the new communication standard can normally receive from the number of normal receptions M and calculating the wireless communication characteristic (throughput) under the new communication standard from the number of data bits/the unit time.

\* \* \* \* \*